United States Patent
Rho et al.

(10) Patent No.: US 9,487,699 B2
(45) Date of Patent: Nov. 8, 2016

(54) LIQUID CRYSTAL DISPLAY PANEL AND LIQUID CRYSTAL DISPLAY APPARATUS HAVING THE SAME

(71) Applicant: SAMSUNG DISPLAY CO., LTD., Yongin, Gyeonggi-Do (KR)

(72) Inventors: Soon-Joon Rho, Suwon-si (KR); Kyung-Min Kim, Seoul (KR); Jin-Lak Kim, Osan-si (KR); Hye-Lim Jang, Hwaseong-si (KR); Keun-Chan Oh, Cheonan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 179 days.

(21) Appl. No.: 14/462,349

(22) Filed: Aug. 18, 2014

(65) Prior Publication Data

US 2015/0109551 A1    Apr. 23, 2015

(30) Foreign Application Priority Data

Oct. 18, 2013 (KR) ........................ 10-2013-0124399

(51) Int. Cl.
 *G02F 1/1337* (2006.01)
 *C09K 19/02* (2006.01)

(52) U.S. Cl.
 CPC ..................................... *C09K 19/02* (2013.01)

(58) Field of Classification Search
 CPC .................................................. C09K 19/02
 USPC ....................................................... 349/130
 See application file for complete search history.

(56) References Cited

U.S. PATENT DOCUMENTS

| 4,722,804 | A | * | 2/1988 | Ishii ................... C09K 19/3458 252/299.5 |
| 4,909,605 | A | * | 3/1990 | Asano ................... G02F 1/1397 349/101 |
| 5,343,318 | A | * | 8/1994 | Basturk ................... G02F 1/139 349/122 |
| 7,525,632 | B2 | | 4/2009 | Park |
| 7,643,124 | B2 | | 1/2010 | Pai et al. |
| 8,003,007 | B2 | | 8/2011 | Hong et al. |
| 8,045,118 | B2 | | 10/2011 | Kim et al. |

(Continued)

FOREIGN PATENT DOCUMENTS

| JP | 11-326918 A | 11/1999 |
| JP | 3183645 B2 | 4/2001 |

(Continued)

OTHER PUBLICATIONS

S-T Wu et al., Optimal operation temperature of liquid crystal modulators, Applied Optics, vol. 26, No. 16, Aug. 15, 1987, pp. 3441-3445.

*Primary Examiner* — Hoan C Nguyen
(74) *Attorney, Agent, or Firm* — Cantor Colburn LLP

(57) ABSTRACT

A liquid crystal display panel includes a first substrate including a pixel electrode, a second substrate a second substrate including a common electrode and disposed opposite to the first substrate, and a liquid crystal layer between the first substrate and the second substrate, where the liquid crystal layer includes liquid crystal molecules having an elastic coefficient of bend phase ($K_{33}$) and an elastic coefficient of splay phase ($K_{11}$), and a ratio of the elastic coefficient of bend phase ($K_{33}$) to the elastic coefficient of splay phase ($K_{11}$) of the liquid crystal molecules in the liquid crystal layer is in a range of about 0.96 to about 1.25.

18 Claims, 5 Drawing Sheets

(56) References Cited

U.S. PATENT DOCUMENTS

| | | | |
|---|---|---|---|
| 8,237,893 B2 | 8/2012 | Utsumi et al. | |
| 2002/0085154 A1* | 7/2002 | Hattori | G02F 1/1337 349/123 |
| 2006/0164351 A1* | 7/2006 | Hsu | G02F 1/1391 345/87 |
| 2006/0164369 A1* | 7/2006 | Park | G09G 3/3648 345/98 |
| 2010/0149460 A1* | 6/2010 | Akao | G02B 5/3016 349/75 |
| 2010/0245726 A1* | 9/2010 | Utsumi | G02F 1/133528 349/96 |
| 2011/0096286 A1* | 4/2011 | Lin | G02F 1/133703 349/189 |

FOREIGN PATENT DOCUMENTS

| | | |
|---|---|---|
| JP | 3508176 B2 | 1/2004 |
| JP | 2006-018116 A | 1/2006 |
| JP | 2007-248699 A | 9/2007 |
| JP | 2009-057459 A | 3/2009 |
| JP | 4556341 B2 | 7/2010 |
| KR | 1020060083643 A | 7/2006 |
| KR | 10-0948614 B1 | 3/2010 |
| KR | 10-0956349 B1 | 4/2010 |

* cited by examiner

LIQUID CRYSTAL DISPLAY PANEL AND LIQUID CRYSTAL DISPLAY APPARATUS HAVING THE SAME

This application claims priority to Korean Patent Application No. 10-2013-0124399, filed on Oct. 18, 2013, and all the benefits accruing therefrom under 35 U.S.C. §119, the content of which are incorporated by reference herein in its entirety.

BACKGROUND

1. Field

Exemplary embodiments relate to a liquid crystal display panel and a liquid crystal display apparatus including the liquid crystal display panel, and more particularly, to a liquid crystal display panel with improved response speed and a liquid crystal display apparatus including the liquid crystal display panel.

2. Description of the Related Art

A liquid crystal display apparatus is one of the most widely used types of flat panel displays. The liquid crystal display apparatus applies an electric field to specific molecules of liquid crystal in a liquid crystal cell to convert arrangements of the molecules and change optical characteristics of the liquid crystal cell such as birefringence, optical activity, dichroism and light scattering, for example, to display an image.

The liquid crystal display apparatus generally includes a pair of substrates including electrodes to form the electric field, and a liquid crystal layer between the substrates. In such a liquid crystal display apparatus, a voltage is applied to the electrodes, such that liquid crystal molecules of the liquid crystal layer may be rearranged. Thus, a transmittance of light, which transmits through the liquid crystal layer, may be controlled.

The liquid crystal molecules are macromolecular compounds, such that the liquid crystal molecules may not response substantially quickly to the electric field. Thus, a response time of the liquid crystal molecules may be delayed such that an afterimage on a screen of the liquid crystal display apparatus may occur.

SUMMARY

Exemplary embodiments provide a liquid crystal display panel with improved response time.

Exemplary embodiments also provide a liquid crystal display apparatus including the above-mentioned liquid crystal display panel.

In an exemplary embodiment, a liquid crystal display panel includes a first substrate including a pixel electrode, a second substrate including a common electrode and disposed opposite to the first substrate, and a liquid crystal layer between the first substrate and the second substrate, where the liquid crystal layer includes liquid crystal molecules having an elastic coefficient of bend phase ($K_{33}$) and an elastic coefficient of splay phase ($K_{11}$), and a ratio of the elastic coefficient of bend phase ($K_{33}$) to the elastic coefficient of splay phase ($K_{11}$) of the liquid crystal molecules in the liquid crystal layer is in a range of about 0.96 to about 1.25.

In an exemplary embodiment, a longitudinal axis of the liquid crystal molecules may be aligned substantially perpendicular to the first substrate and the second substrate, when a voltage is not applied to the electrodes.

In an exemplary embodiment, a longitudinal axis of the liquid crystal molecules may be aligned substantially perpendicular to an electric field, when a voltage is applied to the electrodes.

In an exemplary embodiment, the voltage may be in a range of about 10 volts (V) to about 20 V.

In an exemplary embodiment, the ratio of the elastic coefficient of bend phase ($K_{33}$) to the elastic coefficient of splay phase ($K_{11}$) of the liquid crystal molecules in the liquid crystal layer may be in the range of about 0.96 to about 1.25 at a temperature in a range of about 15° C. to about 25° C.

In an exemplary embodiment, the ratio of the elastic coefficient of bend phase ($K_{33}$) to the elastic coefficient of splay phase ($K_{11}$) of the liquid crystal molecules in the liquid crystal layer may be in a range of about 0.98 to about 1.19 at a temperature in a range of about 26° C. to about 35° C.

In an exemplary embodiment, the ratio of the elastic coefficient of bend phase ($K_{33}$) to the elastic coefficient of splay phase ($K_{11}$) of the liquid crystal molecules in the liquid crystal layer may be in a range of about 1.00 to about 1.19 at a temperature in a range of about 36° C. to about 45° C.

In an exemplary embodiment, a gap between the first substrate and the second substrate may be in a range of about 2.0 micrometers (μm) to about 4.0 μm.

In an exemplary embodiment, a transition temperature of the liquid crystal layer may be in a range of about 70° C. to about 110° C.

In an exemplary embodiment, the liquid crystal molecules may have a negative dielectric anisotropy.

In an exemplary embodiment, the liquid crystal layer may include a reactive mesogen including an acrylate group.

In an exemplary embodiment, a content of the reactive mesogen may be in a range of about 0.01 weight percent (wt %) to about 1.0 wt % based on the total weight of the liquid crystal layer.

In accordance with an exemplary embodiment, a liquid crystal display apparatus includes a liquid crystal display panel including: a first substrate including a pixel electrode; a second substrate including a common electrode, and disposed opposite to the first substrate; and a liquid crystal layer disposed between the first substrate and the second substrate, where the liquid crystal layer includes liquid crystal molecules having an elastic coefficient of bend phase ($K_{33}$) and an elastic coefficient of splay phase ($K_{11}$), and a ratio of the elastic coefficient of bend phase ($K_{33}$) to the elastic coefficient of splay phase ($K_{11}$) of the liquid crystal molecules in the liquid crystal layer is in a range of about 0.96 to about 1.25, and a backlight assembly disposed on a lower surface of the liquid crystal display panel, and which provides light to the liquid crystal display panel.

In an exemplary embodiment, a longitudinal axis of the liquid crystal molecules may be aligned substantially perpendicular to the first substrate and the second substrate, when a voltage is not applied to the electrodes.

In an exemplary embodiment, a longitudinal axis of the liquid crystal molecules may be aligned substantially perpendicular to an electric field, when a voltage is applied to the electrodes.

In an exemplary embodiment, the ratio of the elastic coefficient of bend phase ($K_{33}$) to the elastic coefficient of splay phase ($K_{11}$) of the liquid crystal molecules in the liquid crystal layer may be in the range of about 0.96 to about 1.25 at a temperature in a range of about 15° C. to about 25° C.

In an exemplary embodiment, the ratio of the elastic coefficient of bend phase ($K_{33}$) to the elastic coefficient of splay phase ($K_{11}$) of the liquid crystal molecules in the liquid crystal layer may be in a range of about 0.98 to about 1.19 at a temperature in a range of about 26° C. to about 35° C.

In an exemplary embodiment, the ratio of the elastic coefficient of bend phase ($K_{33}$) to the elastic coefficient of splay phase ($K_{11}$) of the liquid crystal molecules in the liquid crystal layer may be in a range of about 1.00 to about 1.19 at a temperature in a range of about 36° C. to about 45° C.

In an exemplary embodiment, a gap between the first substrate and the second substrate may be within a range of about 2.0 μm to about 4.0 μm.

In an exemplary embodiment, the liquid crystal molecules may have a negative dielectric anisotropy.

In such embodiments, a response time of a liquid crystal display panel in a vertically aligned ("VA") liquid crystal mode may be improved.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
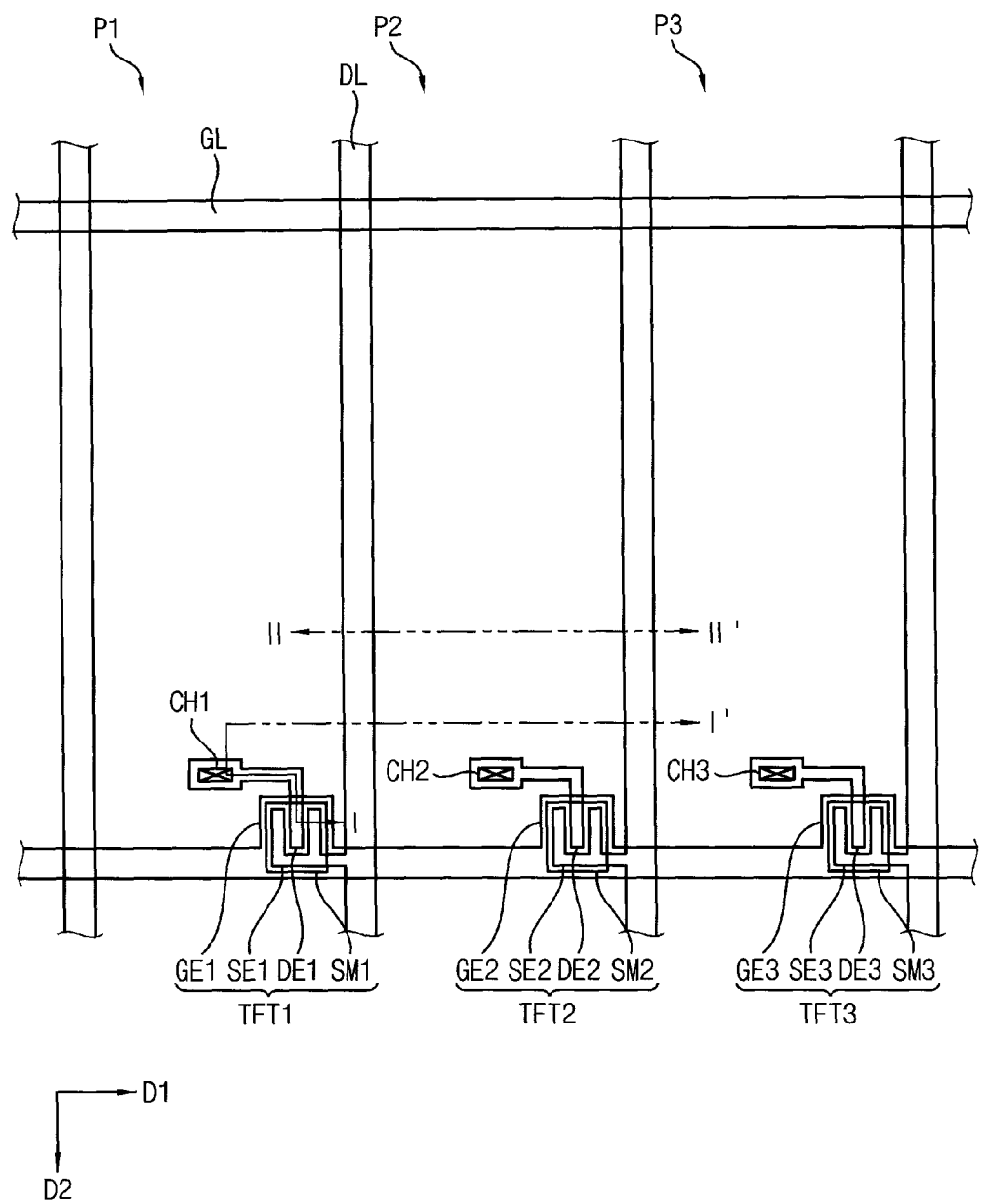
FIG. 1 is a plan view illustrating an exemplary embodiment of a liquid crystal display apparatus, according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described in detail with reference to the accompanying drawings.

Figure 2:
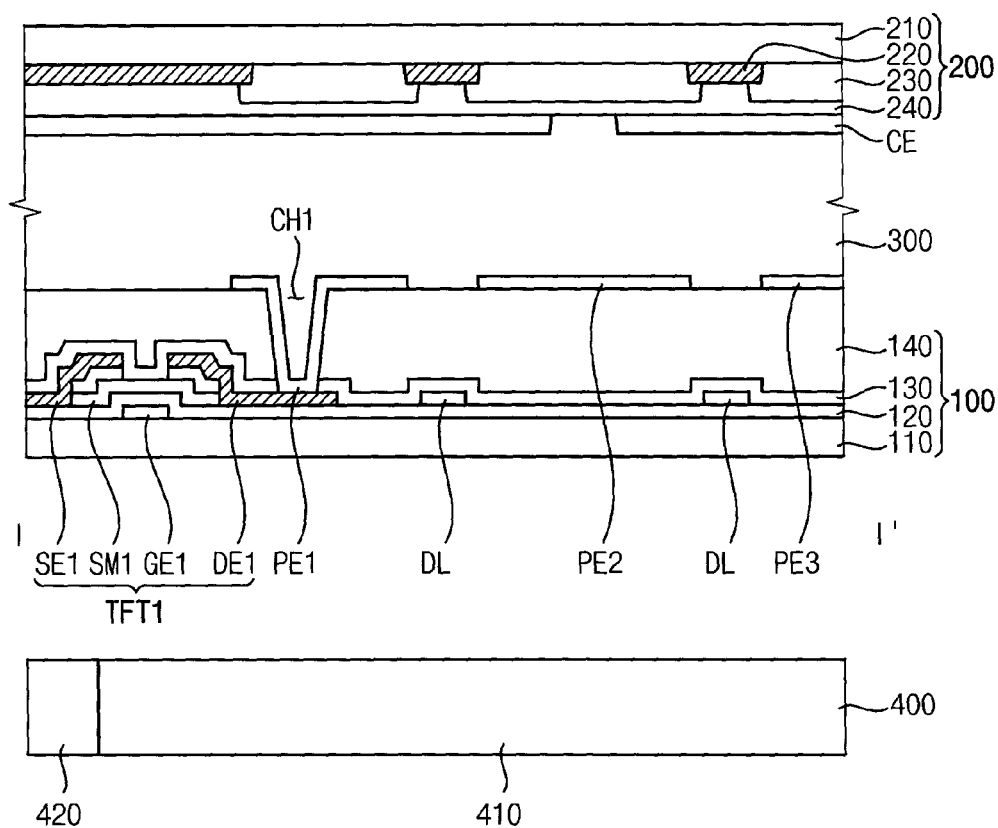
FIG. 2 is a cross-sectional view taken along the line I-I' of the liquid crystal display panel shown in FIG. 1.

FIG. 1 is a plan view illustrating an exemplary embodiment of a liquid crystal display apparatus, according to the invention. FIG. 2 is a cross-sectional view taken along line I-I' of the liquid crystal display panel in FIG. 1.

Referring to FIG. 1, an exemplary embodiment of a display panel includes a plurality of gate lines GL, a plurality of data lines DL and a plurality of pixels, e.g., a first pixel P1, a second pixel P2 and a third pixel P3.

In an exemplary embodiment, the gate lines GL may extend substantially in a first direction D1, and the data lines DL may extend substantially in a second direction D2, which is perpendicular to the first direction D1. Alternatively, the gate lines GL may extend substantially in the second direction D2, and the data lines DL may extend substantially in the first direction D1.

The pixels may be arranged substantially in a matrix shape. In an exemplary embodiment, the pixels may be disposed in areas defined by the gate lines GL and the data lines DL, but not being limited thereto.

Each pixel may be connected to a corresponding gate line GL and a corresponding data line DL adjacent thereto.

In an exemplary embodiment, each pixel may have a rectangle shape extending in the second direction D2. Alternatively, the pixel may have a V-shape or a Z-shape, for example.

Referring to FIGS. 1 and 2, the liquid crystal display apparatus includes a liquid crystal display panel and a backlight assembly.

The liquid crystal display panel includes a first substrate 100, a second substrate 200 and a liquid crystal layer 300.

The first substrate 100 includes a first base substrate 110, thin film transistors, e.g., a first thin film transistor TFT1, a second thin film transistor TFT2 and a third thin film transistor TFT3, a gate insulation layer 120, a data insulation layer 130, a first over-coating layer 140 and pixel electrodes, e.g., a first pixel electrode PE1, a second pixel electrode PE2 and a third pixel electrode PE3.

The first base substrate 110 may be a transparent insulation substrate. In one exemplary embodiment, for example, the transparent insulation substrate may be a glass substrate or a plastic substrate, but not being limited thereto. A plurality of pixel areas for displaying an image may be defined on the first base substrate 110. A plurality of the pixel areas may be disposed substantially in a matrix form having a plurality of rows and a plurality of columns.

Each pixel may further include a switching element. In one exemplary embodiment, for example, the switching element may be a thin film transistor. The switching element may be connected to the corresponding gate line GL and the corresponding data line DL adjacent thereto. The switching element may be disposed at a crossing area of the gate line GL and the data line DL.

A gate pattern may be disposed on the first base substrate 110. The gate pattern may include gate electrodes, e.g., a first gate electrode GE1, a second gate electrode GE2 and a third gate electrode GE3, and the gate line GL. The gate line GL is electrically connected to corresponding gate electrodes.

The gate insulation layer 120 may be disposed on the base substrate 110 to cover the gate pattern and may insulate the gate pattern.

Semiconductor patterns, e.g., a first semiconductor pattern SM1, a second semiconductor pattern SM2 and a third semiconductor pattern SM3, may be disposed on the gate insulation layer 120. The semiconductor patterns SM1, SM2 and SM3 may overlap the gate electrodes GE1, GE2 and GE3, respectively.

A data pattern may be disposed on the semiconductor patterns SM1, SM2 and SM3, which is disposed on the gate insulation layer 120. The data pattern may include a data line DL, source electrodes, e.g., a first source electrode SE1, a second source electrode SE2 and a third source electrode SE3, and drain electrodes, e.g., a first drain electrode DE1, a second drain electrode DE2 and a third drain electrode DE3. The source electrodes SE1, SE2 and SE3 may overlap the semiconductor patterns SM1, SM2 and SM3, respectively. The source electrodes SE1, SE2 and SE3 may be electrically connected to the data line DL.

The drain electrodes DE1, DE2 and DE3 may be respectively spaced apart from the source electrodes SE1, SE2 and SE3, which are on the semiconductor patterns SM1, SM2 and SM3, respectively. Each of the semiconductor patterns SM1, SM2 and SM3 may include a conductive channel defined between a corresponding source electrode SE1, SE2 or SE3 and a corresponding drain electrode DE1, DE2 or DE3.

The thin film transistor may be defined by a gate electrode, a source electrode, a drain electrode and a semiconductor pattern. In an exemplary embodiment, as shown in FIG. 1, the first thin film transistor TFT1 is defined by the first gate electrode GE1, the first source electrode SE1, the first drain electrode DE1 and the first semiconductor pattern SM1, the second thin film transistor TFT2 is defined by the second gate electrode GE2, the second source electrode SE2, the second drain electrode DE2 and the second semiconductor pattern SM2, and the third thin film transistor TFT3 is defined by the third gate electrode GE3, the third source electrode SE3, the third drain electrode DE3 and the third semiconductor pattern SM3.

The data insulation layer 130 may be disposed on the gate insulation layer 120. The data insulation layer 130 may insulate the data pattern.

The gate line GL, the data line DL and the switching element may be disposed on the gate insulation layer 120. The switching element may include the gate electrodes GE1, GE2 and GE3, the gate insulation layer 120, the semiconductor patterns SM1, SM2 and SM3, the source electrodes SE1, SE2 and SE3, and the drain electrodes DE1, DE2 and DE3. The gate insulation layer 120 may be disposed on a whole surface of the first base substrate 110.

The gate insulation layer 120 may include an organic insulation material or an inorganic insulation material. In one exemplary embodiment, for example, the gate insulation layer 120 may include benzocyclobutene polymer, olefin polymer, polyimide polymer, acryl polymer, polyvinyl polymer, siloxane polymer, silicon polymer, or a combination thereof.

The data insulation layer 130 may be disposed on the gate line GL, the data line DL and the switching element. The data insulation layer 130 may be disposed on a whole surface of the first base substrate 110. The data insulation layer 130 may include an organic insulation material or an inorganic insulation material. In one exemplary embodiment, for example, the data insulation layer 130 may include benzocyclobutene polymer, olefin polymer, polyimide polymer, acryl polymer, polyvinyl polymer, siloxane polymer, silicon polymer, or a combination thereof.

A first over-coating layer 140 may be disposed on the data insulation layer 130 to provide a flat surface on an upper surface of the first substrate 100.

The first over-coating layer 140 may include an organic insulation material or an inorganic insulation material. In one exemplary embodiment, for example, the first over-coating layer 140 may include benzocyclobutene polymer, olefin polymer, polyimide polymer, acryl polymer, polyvinyl polymer, siloxane polymer, silicon polymer, or a combination thereof.

The pixel electrodes PE1, PE2 and PE3 may be disposed on the first over-coating layer 140. Each of the pixel electrodes PE1, PE2 and PE3 may be electrically connected to a corresponding thin film transistor through a contact hole, e.g., a first contact hole CH1, a second contact hole CH2 or a third contact hole CH3. The pixel electrodes PE1, PE2 and PE3 may be disposed in the pixel area. A grayscale voltage may be applied to the pixel electrodes PE1, PE2 and PE3 through the thin film transistor.

The pixel electrodes PE1, PE2 and PE3 may include a transparent conductive material, such as indium tin oxide ("ITO"), indium zinc oxide ("IZO") and aluminum zinc oxide ("AZO"), for example. In one exemplary embodiment, for example, the pixel electrodes PE1, PE2 and PE3 may have a slit pattern.

The second substrate 200 includes a second base substrate 210, a black matrix 220, a color filter 230, a second over-coating layer 240 and a common electrode CE.

The second base substrate 210 may be a transparent insulation substrate. In one exemplary embodiment, for example, the transparent insulation substrate may be a glass substrate or a plastic substrate, but not being limited thereto.

The black matrix 220 may be disposed on the second base substrate 210. The black matrix 220 may extend substantially in the first direction D1, which is substantially perpendicular to an extending direction of the data line.

The black matrix 220 may be disposed in an area, where the gate line GL, the data line DL and the switching element is disposed.

In an exemplary embodiment, the gate pattern may include a plurality of gate lines GL and the data pattern may include a plurality of data lines DL, and the black matrix 220 may overlap the gate lines GL and the data lines DL. The gate lines may extend substantially in the first direction D1. The data lines DL may extend substantially in the second direction D2, which is perpendicular to the first direction D1. The black matrix 220 may block light. The black matrix 220 may be disposed on a non-display area. The black matrix 220 may be disposed in boarder areas between adjacent pixel areas.

In one exemplary embodiment, for example, the black matrix 220 may include a photosensitive organic material having a carbon black.

The color filter 230 may be disposed on the second base substrate 210 and the black matrix 220.

The color filter 230 may provide a color to light penetrating the liquid crystal layer 300. The color filters 230 may include a red color filter, a green color filter and a blue color filter. Each color filter 230 may correspond to one of the pixel areas. The color filters 230 adjacent to each other may have different colors from each other.

The color filter 230 may be spaced apart from a border between pixel areas adjacent to each other. The black matrix 220 may be disposed on the border between pixel areas adjacent to each other.

The color filter 230 may be disposed between the black matrices 220 adjacent to each other.

In an exemplary embodiment, the display panel has a structure, in which the black matrix 220 and the color filter 230 are disposed on an upper surface of the liquid crystal layer 300. In an alternative exemplary embodiment, a display panel may have a structure such as a color filter-on-array ("COA") structure or a black matrix-on-array ("BOA") structure. In an exemplary embodiment where the display panel has the COA structure, a color filter is disposed on a lower surface of a liquid crystal layer. In an exemplary embodiment where the display panel has the BOA structure, the black matrix is disposed on a lower surface of a liquid crystal layer.

The second over-coating layer 240 may be disposed on the second base substrate 210 to flatten an upper surface of the second substrate 200. In one exemplary embodiment, for example, the second over-coating layer 240 may be disposed on the black matrix 220 and the color filter 230.

The second over-coating layer 240 may include an organic insulation material or an inorganic insulation material. In one exemplary embodiment, for example, the second over-coating layer 240 may include benzocyclobutene polymer, olefin polymer, polyimide polymer, acryl polymer, polyvinyl polymer, siloxane polymer, silicon polymer, or a combination thereof.

The common electrode CE may be disposed on an upper surface of the second over-coating layer 240. In one exemplary embodiment, for example, the common electrode CE may include a transparent conductive material, such as ITO, IZO and AZO.

The liquid crystal layer 300 may be disposed between the first substrate 100 and the second substrate 200. The liquid crystal layer 300 may include liquid crystal molecules. An arrangement of the liquid crystal molecules is controlled by an electric field. The electric field may be generated by a voltage applied to the pixel electrode PE and the common electrode CE. Thus, the liquid crystal layer 300 may control a light transmittance of the pixel.

The liquid crystal molecules and an arrangement of the liquid crystal molecules will be described in detail with reference to FIGS. 3 and 4.

Referring to FIG. 2, the liquid crystal display apparatus may include the backlight assembly 400. The backlight assembly 400 may be disposed on a lower surface of the liquid crystal display panel and may provide light to the liquid crystal display panel.

The backlight assembly 400 may include a light guide plate 410 and a light source 420.

The light guide plate 410 may be disposed on a lower surface of the liquid crystal display panel. The light guide plate 410 may guide light provided from the light source 420 to the liquid crystal display panel.

In an exemplary embodiment, the light source 420 may be disposed on a side surface of the light guide plate 410. The light source 420 may provide light to the light guide plate 410. The light source 420 may include a plurality of light emitting devices.

The light source 420 may include a light emitting diode. In an exemplary embodiment, a plurality of the light emitting diodes may be disposed on a driving substrate. The light emitting diode may include a white light emitting diode. Alternatively, the light emitting diode may include a red light emitting diode, a green light emitting diode and a blue light emitting diode.

The backlight assembly 400 may be an edge-type, in which the light source is disposed on a side surface of the backlight assembly. Alternatively, a backlight assembly may be a direct type.

The liquid crystal display apparatus may further include a first polarizer disposed on a lower surface of the first substrate 100 and a second polarizer disposed on an upper surface of the second substrate 200.

The first polarizer may polarize the light provided from the backlight assembly 400. The first polarizer may have a first polarized axis. The first polarizer may transmit light having the first polarized axis.

The second polarizer may polarize light exiting from the color filter 230. The second polarizer may have a second polarized axis. The second polarized axis may be perpendicular to the first polarized axis. The second polarizer may transmit light having the second polarized axis.

The liquid crystal display panel may further include an alignment layer to align the liquid crystal layer 300.

The alignment layer may be disposed between the liquid crystal layer 300 and the first substrate 100. The alignment layer may be disposed between the liquid crystal layer 300 and the second substrate 200.

The alignment layer allows the liquid crystal molecules in the liquid crystal layer 300 to arrange with pre-tilts. The alignment layer may be formed from an alignment composition. In an exemplary embodiment, the alignment composition may be coated on the first substrate 100 and the second substrate 200, and then a solvent in the alignment composition is removed. The alignment composition may be obtained by mixing an alignment material, such as polyimide ("PI"), with a solvent.

The solvent in the alignment composition may be partially removed at a room temperature or by heating. After the alignment layer is formed, the first substrate 100 and the second substrate 200 may be rubbed.

Figure 3:
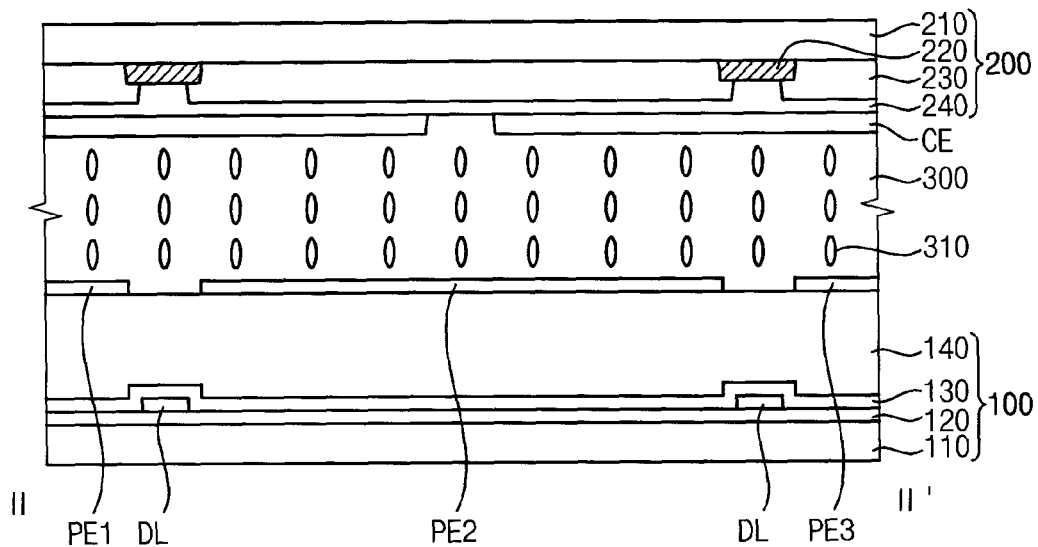
FIG. 3 is a cross-sectional view taken along the line II-II' in FIG. 1 of illustrating a liquid crystal display panel in a black mode.
Figure 5:
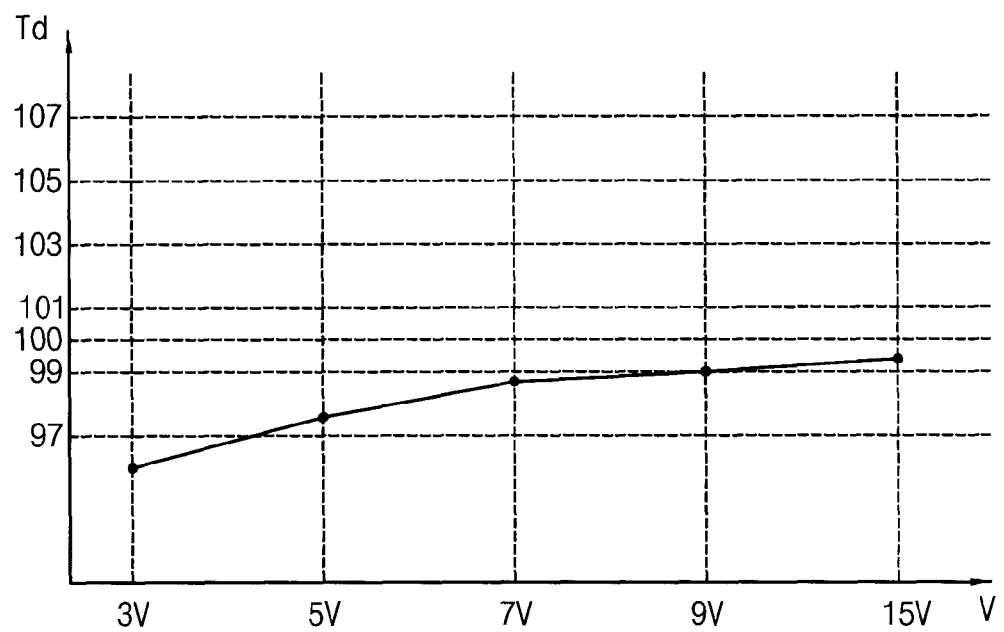
FIGS. 5 and 6 are graphs illustrating a decay time of liquid crystal molecules according to voltages applied to a liquid crystal display panel.
Figure 6:
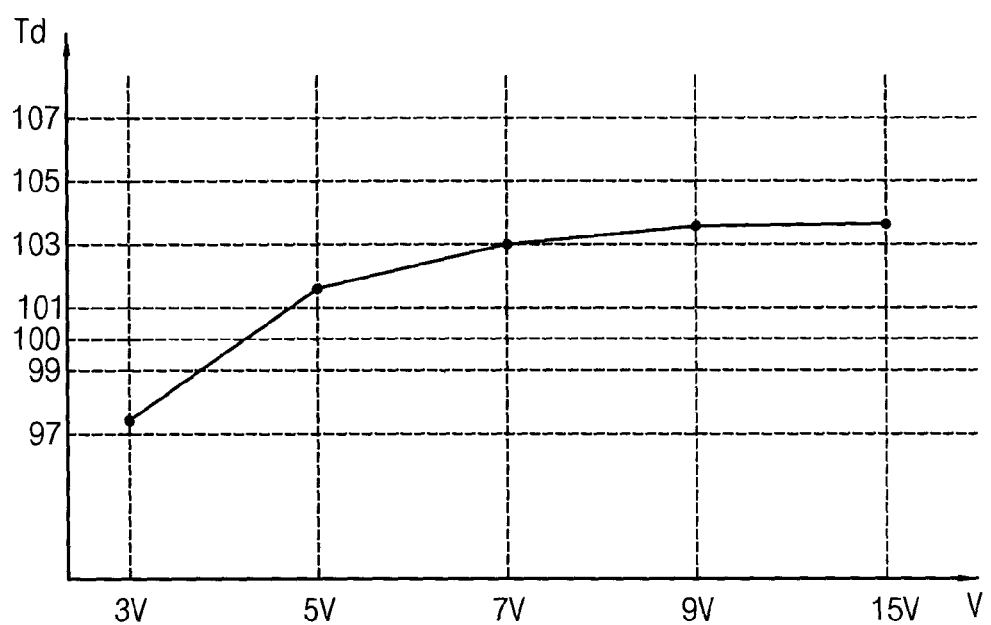

FIG. 3 is a cross-sectional view taken along line II-II' in FIG. 1, illustrating a liquid crystal display panel in a black mode. FIG. 4 is a cross-sectional view taken along line II-II' in FIG. 1, illustrating a liquid crystal display panel in a white mode. FIGS. 5 and 6 are graphs illustrating a decay time of liquid crystal molecules according to voltages applied to a liquid crystal display panel.

Figure 4:
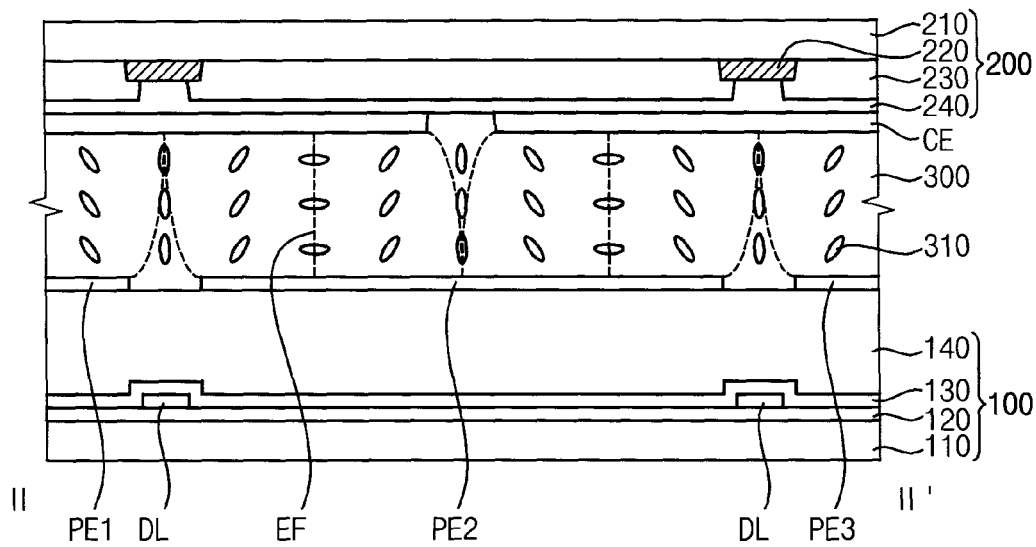
FIG. 4 is a cross-sectional view taken along the line II-II' in FIG. 1 illustrating a liquid crystal display panel in a white mode.

Referring to FIGS. 3 and 4, in an exemplary embodiment, the liquid crystal layer 300 may be disposed between the first substrate 100 and the second substrate 200. The first substrate 100 may include a plurality of pixel electrodes disposed on the first base substrate 110, e.g., first to third pixel electrodes PE1, PE2 and PE3. The second substrate 200 may include a common electrode CE disposed on the second base substrate 210.

FIG. 3 shows a liquid crystal display panel in a black mode with a low voltage. FIG. 4 shows a liquid crystal display panel in a white mode with a high voltage.

The liquid crystal layer 300 may include liquid crystal molecules 310. In an exemplary embodiment, the liquid crystal layer 300 may operate in a vertically aligned liquid crystal mode. In such an embodiment, a longitudinal axis of the liquid crystal molecules 310 may be aligned to be substantially perpendicular to the first substrate 100 and the second substrate 200.

In such an embodiment, when a voltage applies to the liquid crystal layer 300, the longitudinal axis of the liquid crystal molecules 310 may be aligned to be substantially perpendicular to an electric field. In one exemplary embodiment, for example, the voltage applied to the liquid crystal layer 300 may be in a range of about 10 volts (V) to about 20 V.

The liquid crystal molecules 310 of the liquid crystal layer 300 may be a liquid crystal mixture having at least two kinds of liquid crystal molecules. In general, a manufacturing of a liquid crystal having a specific physical property with a single liquid crystal molecule is difficult. Properties of the single liquid crystal are generally well-known in the art. Furthermore, various computer programs may be used to predict properties of a liquid crystal mixture by the properties of the single liquid crystal.

Therefore, a method of preparing a liquid crystal having a specific range of a dielectric anisotropy and an elastic modulus may be well-known in the art, and a detailed description of a manufacturing the liquid crystal will hereinafter be omitted.

A response time Tre may be defined by a sum of a rising time Tr and a decay time Td.

The rising time Tr means a time for aligning a liquid crystal molecule 310 to be substantially perpendicular to an electric field and maintaining alignment of the liquid crystal molecule 310 in a stable state, when an electric field is generated between a pixel electrode PE and a common electrode CE by a driving voltage, as shown in FIG. 4. The decay time Td means a time for returning the liquid crystal molecule 310 to an original alignment thereof, when the electric field disappears as shown in FIG. 3.

In one exemplary embodiment, for example, the rising time Tr may be a time for which the liquid crystal molecule 310 is aligned to be substantially perpendicular to the electric field by the driving voltage, such that the liquid crystal molecule 310 may be in a metastable state. In such an embodiment, the rising time Tr may be a time for which a light transmittance varies from about 10% to about 90% in a normally black vertically aligned liquid crystal mode. The decay time Td may be a time for returning the liquid crystal molecule 310 to an original alignment when the electric field disappears. In such an embodiment, the decay time Td may be a time for which a light transmittance varies from about 90% to about 10% in the normally black vertically aligned liquid crystal mode.

The rising time Tr and the decay time Td may satisfy the following Equation 1 and Equation 2, respectively.

$$\tau_r = \frac{\gamma_1 d^2 / K_{33}\pi^2}{(V/V_{th})^2 - 1} \qquad \text{Equation 1}$$

$$\tau_d = \frac{\gamma_1 d^2}{K_{33}\pi^2} \qquad \text{Equation 2}$$

In the equations above, $\gamma_1$ denotes a rotational viscosity coefficient of the liquid crystal molecules in the liquid crystal layer 300, d denotes a cell gap between the first substrate 100 and the second substrate 200. $K_{33}$ denotes an elastic coefficient of bend phase of the liquid crystal molecules in the liquid crystal layer 300, which corresponds to an elastic restoring force of a bend strain. $\pi^2$ denotes a product of a permittivity of liquid crystal molecules in a vacuum state multiplied by a dielectric anisotropy of liquid crystal molecules. V denotes a driving voltage. $V_{th}$ denotes a threshold voltage of the liquid crystal molecules. The threshold voltage $V_{th}$ is defined as a voltage when a light transmittance starts to change.

In accordance with Equation 1 and Equation 2, the rising time Tr is proportional to the rotational viscosity coefficient γ and a square of the cell gap d. The rising time Tr is inversely proportional to a square of a divided value of an applied voltage divided by the threshold voltage, the permittivity of the liquid crystal molecules and the dielectric anisotropy of the liquid crystal molecules in the liquid crystal layer 300. The decay time Td is proportional to the rotational viscosity coefficient γ and a square of the cell gap d. The decay time Td is inversely proportional to the elastic coefficient of bend phase $K_{33}$, the permittivity of the liquid crystal molecules and the dielectric anisotropy of the liquid crystal molecules.

Herein, $K_{11}$, $K_{22}$ and $K_{33}$ denote an elastic coefficient of splay phase, an elastic coefficient of a twist phase and an elastic coefficient of a bend phase of the liquid crystal molecules in the liquid crystal layer 300, respectively. When an external force is applied to the liquid crystal molecules and the liquid crystal molecules are thereby transformed, the liquid crystal molecules has a splay phase, a twist phase or a bend phase. $K_{11}$, $K_{22}$ and $K_{33}$ may represent an elastic restoring force from the splay phase, the twist phase and the bend phase to an original phase.

Alternatively, a response time Tre may be defined by a figure of merit ("FoM") of the liquid crystal molecules.

The FoM may satisfy the following Equation 3.

$$FoM = K\Delta n^2/\gamma_1 \qquad \text{Equation 3}$$

In Equation 3, K denotes one of $K_{11}$ and $K_{33}$. K may be determined by an alignment of the liquid crystal molecules. In one exemplary embodiment, for example, where the liquid crystal molecules having a positive dielectric anisotropy are aligned horizontally, the K is $K_{11}$. In one exemplary embodiment, for example, where the liquid crystal molecules having a negative dielectric anisotropy are aligned vertically, the K is $K_{33}$. In Equation 3, n denotes a birefringence of the liquid crystal molecules, and $\gamma_1$ denotes a rotational viscosity coefficient.

In accordance with Equation 3, the FoM is proportional to one of $K_{11}$ and $K_{33}$, and a square of the birefringence of the liquid crystal molecules. The FoM is inversely proportional to the rotational viscosity coefficient.

In accordance with a definition of the FoM, liquid crystal molecules having substantially a same FoM have a similar decay time. Thus, when the FoM increases, the response time of the liquid crystal molecules increases.

However, referring to Table 1, although liquid crystal molecules have the same figure of merit, the response time may be different according to a ratio of the elastic coefficient of bend phase ($K_{33}$) to the elastic coefficient of splay phase ($K_{11}$), that is, $K_{33}/K_{11}$ ratio.

TABLE 1

|  | Example 1 | Example 2 | Comparative Example |
|---|---|---|---|
| $K_{11}$ | 12.5 | 13.9 | 12.7 |
| $K_{33}$ | 14.4 | 16.3 | 16.3 |
| $K_{33}/K_{11}$ | 1.152 | 1.173 | 1.283 |
| FIGURE of merit (FoM) | 45 | 45 | 45 |
| Decay time (Td) | 100 | 98.2 | 101.8 |

Table 1 shows the decay time Td of the liquid crystal molecules 310 having a same FoM and different $K_{33}/K_{11}$ ratios.

Example 1 and Example 2 have different values of the elastic coefficient of bend phase ($K_{33}$) and the elastic coefficient of splay phase ($K_{11}$), but the ratios of the elastic coefficient of bend phase ($K_{33}$) to the elastic coefficient of splay phase ($K_{11}$) are similar to each other. Comparative Example has the same FoM as Example 1 and Example 2, but the ratio of the elastic coefficient of bend phase ($K_{33}$) to the elastic coefficient of splay phase ($K_{11}$) is different from Example 1 and Example 2.

The decay times Td are relative values of Example 1, Example 2 and Comparative Example. The decay times of Example 2 and Comparative Example are relative values, relative to the decay time Td of Example 1 which is arbitrary set as 100. The decay times Td are mean values of decay times measured in about 3 V to about 15 V.

Referring to Table 1 and FIG. 5, FIG. 5 is a graph illustrating a decay time according to Example 2 in comparison with a decay time according to Example 1. When about 3 V is applied to the liquid crystal, the decay time according to Example 2 is about 96.5. When a voltage greater than about 3 V is applied to the liquid crystal molecules 310, the decay time according to Example 2 is not substantially increased. However, overall values of the decay time according to Example 2 are less than the decay time according to Example 1.

Referring to Table 1 and FIG. 6, FIG. 6 is a graph illustrating a decay time according to Comparative Example in comparison with a decay time according to Example 1. When about 3 V is applied to the liquid crystal molecules 310, the decay time according to Comparative Example is about 98. Thus, the decay time according to Comparative Example is substantially the same as the decay time according to Example 1 and Example 2. When a voltage greater than about 3 V is applied to the liquid crystal molecules 310, the decay time according to Comparative Example is substantially increased. As shown in FIG. 6, when about 15 V is applied to the liquid crystal molecules 310, the decay time according to Comparative Example is about 103.5. Thus, the decay time according to Comparative Example is increased about 4% compared to the decay time according to Example 1 and Example 2.

Generally, the liquid crystal molecules 310 have a bend phase such as $K_{33}$ with a low voltage. Therefore, a decay time is relatively short with a low voltage.

In an exemplary embodiment, the liquid crystal molecules 310 have a mixed phase such as $K_{33}$, $K_{22}$, $K_{11}$ with a high voltage. Therefore, a decay time may be relatively long with a high voltage.

Thus, in an exemplary embodiment, a response time may be improved by controlling the ratio of the elastic coefficient of bend phase ($K_{33}$) to the elastic coefficient of splay phase ($K_{11}$) in a high voltage state.

In one exemplary embodiment, for example, the elastic coefficient of bend phase ($K_{33}$) to the elastic coefficient of splay phase ($K_{11}$) may be in a range of about 0.96 to about 1.25. When the ratio of the elastic coefficient of bend phase ($K_{33}$) to the elastic coefficient of splay phase ($K_{11}$) is less than about 0.96 or greater than about 1.25, the decay time is substantially increased in a high voltage state.

In an exemplary embodiment, the birefringence of the liquid crystal layer, the rotational viscosity coefficient and the elastic coefficient are all temperature-sensitive, for example, when a temperature increases, the rotational viscosity coefficient increases. Thus, in accordance with Equation 2, when a temperature increases, the decay time increases and the FoM decreases.

In one exemplary embodiment, for example, the elastic coefficient of bend phase ($K_{33}$) to the elastic coefficient of splay phase ($K_{11}$) of liquid crystal molecules 310 in the liquid crystal layer 300 is in the range of about 0.96 to about 1.25 at a temperature in a range of about 15° C. to about 25° C.

In one exemplary embodiment, for example, the elastic coefficient of bend phase ($K_{33}$) to the elastic coefficient of splay phase ($K_{11}$) of liquid crystal molecules 310 in the liquid crystal layer 300 is in a range of about 0.98 to about 1.19 at a temperature in a range of about 26° C. to about 35° C.

In one exemplary embodiment, for example, the elastic coefficient of bend phase ($K_{33}$) to the elastic coefficient of splay phase ($K_{11}$) of liquid crystal molecules 310 in the liquid crystal layer 300 is in a range of about 1.00 to about 1.19 at a temperature in a range of about 36° C. to about 45° C.

In an exemplary embodiment, a gap between the first substrate 100 and the second substrate 200 may be in a range of about 2.0 micrometers (μm) to about 4.0 μm.

When the gap between the first substrate 100 and the second substrate 200 is less than 2.0 μm, a thickness of the liquid crystal layer 300 may be too thin such that a light transmittance may be substantially low. When the gap between the first substrate 100 and the second substrate 200 is more than 4.0 μm, the thickness of the liquid crystal layer 300 may be too thick such that a response time of the liquid crystal layer 300 may be substantially slow.

In an exemplary embodiment, a transition temperature of the liquid crystal layer 300 may be in a range of about 70° C. to about 110° C.

In an exemplary embodiment, when the liquid crystal molecules 310 is injected between the first substrate 100 and the second substrate 200, a flow effect of the liquid crystal molecules 310 may be remained, such that a predetermined or desired alignment of the liquid crystal molecules 310 may not be obtained. In an exemplary embodiment, an aging method may be used to achieve a predetermined alignment of the liquid crystal molecules 310. In such an embodiment, the liquid crystal molecules 310 may be injected at a temperature, which is higher than the transition temperature.

In an exemplary embodiment, where the liquid crystal molecules 310 are injected by the aging method, a liquid crystal character of the liquid crystal molecules 310 may be eliminated such that the liquid crystal molecules 310 having an isotropic phase may be injected. In such an embodiment, the liquid crystal molecules 310 are cooled at a room temperature after injecting the liquid crystal molecules using the aging method, and the liquid crystal molecules 310 adjacent to the first substrate 100 and the second substrate 200 may be aligned with a predetermined or desired direction.

In an exemplary embodiment, the liquid crystal molecules 310 may have a negative dielectric anisotropy.

Generally, liquid crystal molecules may have a positive dielectric anisotropy or a negative dielectric anisotropy. In an exemplary embodiment, where the liquid crystal layer 300 is in a normally black mode, liquid crystal molecules have a negative dielectric anisotropy. When liquid crystal molecules have a negative dielectric anisotropy and a voltage greater than the threshold voltage is applied, a longitudinal axis of the liquid crystal molecules 310 may be aligned substantially perpendicular to the electric field.

The liquid crystal layer 300 may include a reactive mesogen including an acrylate group to pre-tilt the liquid crystal molecules 310.

In an exemplary embodiment, a content of the reactive mesogen may be in a range of about 0.01 weight percent (wt %) to about 1.0 wt % based on a total weight of the liquid crystal layer 300. When the content of the reactive mesogen is less than about 0.01 wt % based on a total weight of the liquid crystal layer 300, an alignment of the liquid crystal molecules 310 is difficult to control. When the content of the reactive mesogen is greater than about 1.0 wt % based on a total weight of the liquid crystal layer 300, a restoring time of the liquid crystal molecules 310 is slow, such that a response time of the liquid crystal layer 300 is substantially slow.

In an exemplary embodiment of the invention, a liquid crystal display panel and a liquid crystal display apparatus including the liquid crystal display panel may include liquid crystal molecules having the elastic coefficient of bend phase ($K_{33}$) and the elastic coefficient of splay phase ($K_{11}$), in which a ratio of the elastic coefficient of bend phase ($K_{33}$) to the elastic coefficient of splay phase ($K_{11}$) is in a range of about 0.96 to about 1.25. Therefore, a response time of the liquid crystal display panel may be improved.

In an exemplary embodiment, a liquid crystal display panel and a liquid crystal display apparatus described herein are applicable to an electronic device, such as a television, a personnel computer and a mobile device, for example.

Although a few exemplary embodiments of the invention have been described, it is understood that the invention should not be limited to these exemplary embodiments and various changes and modifications can be made by one of those ordinary skilled in the art within the spirit and scope of the invention as hereinafter claimed.

What is claimed is:

1. A liquid crystal display panel comprising:
a first substrate comprising a pixel electrode;
a second substrate comprising a common electrode, and disposed opposite to the first substrate; and
a liquid crystal layer disposed between the first substrate and the second substrate,
wherein
the liquid crystal layer comprises liquid crystal molecules having an elastic coefficient of bend phase ($K_{33}$) and an elastic coefficient of splay phase ($K_{11}$), and
a ratio of the elastic coefficient of bend phase ($K_{33}$) to the elastic coefficient of splay phase ($K_{11}$) of the liquid crystal molecules in the liquid crystal layer is in a range of about 0.98 to about 1.19 at a temperature in a range of about 26° C. to about 35° C.

2. The liquid crystal display panel of claim 1, wherein a longitudinal axis of the liquid crystal molecules is aligned substantially perpendicular to the first substrate and the second substrate, when a voltage is not applied to the electrodes.

3. The liquid crystal display panel of claim 2, wherein the longitudinal axis of the liquid crystal molecules is aligned substantially perpendicular to an electric field, when a voltage is applied to the electrodes.

4. The liquid crystal display panel of claim 3, wherein the voltage is in a range of about 10 volts to about 20 volts.

5. The liquid crystal display panel of claim 1, wherein the ratio of the elastic coefficient of bend phase ($K_{33}$) to the elastic coefficient of splay phase ($K_{11}$) of the liquid crystal molecules in the liquid crystal layer is in the range of about 0.96 to about 1.25 at a temperature in a range of about 15° C. to about 25° C.

6. The liquid crystal display panel of claim 1, wherein the ratio of the elastic coefficient of bend phase ($K_{33}$) to the elastic coefficient of splay phase ($K_{11}$) of the liquid crystal molecules in the liquid crystal layer is in a range of about 1.00 to about 1.19 at a temperature in a range of about 36° C. to about 45° C.

7. The liquid crystal display panel of claim 1, wherein a gap between the first substrate and the second substrate is in a range of about 2.0 micrometers to about 4.0 micrometers.

8. The liquid crystal display panel of claim 1, wherein a transition temperature of the liquid crystal layer is in a range of about 70° C. to about 110° C.

9. The liquid crystal display panel of claim 1, wherein the liquid crystal molecules have a negative dielectric anisotropy.

10. The liquid crystal display panel of the claim 1, wherein the liquid crystal layer comprises a reactive mesogen comprising an acrylate group.

11. The liquid crystal display panel of the claim 10, wherein a content of the reactive mesogen is in a range of about 0.01 weight percent to about 1.0 weight percent based on the total weight of the liquid crystal layer.

12. A liquid crystal display apparatus comprising:
a liquid crystal display panel comprising:
a first substrate comprising a pixel electrode;
a second substrate comprising a common electrode, and disposed opposite to the first substrate; and
a liquid crystal layer disposed between the first substrate and the second substrate, wherein the liquid crystal layer comprises liquid crystal molecules having an elastic coefficient of bend phase ($K_{33}$) and an elastic coefficient of splay phase ($K_{11i}$), and a ratio of the elastic coefficient of bend phase ($K_{33}$) to the elastic coefficient of splay phase ($K_{11}$) of the liquid crystal molecules in the liquid crystal layer is in a range of about 0.98 to about 1.19 at a temperature in a range of about 26° C. to about 35° C.; and
a backlight assembly disposed on a lower surface of the liquid crystal display panel, and which provides light to the liquid crystal display panel.

13. The liquid crystal display apparatus of claim 12, wherein a longitudinal axis of the liquid crystal molecules is aligned substantially perpendicular to the first substrate and the second substrate, when a voltage is not applied to the electrodes.

14. The liquid crystal display apparatus of claim 13, wherein the longitudinal axis of the liquid crystal molecules is aligned substantially perpendicular to an electric field, when a voltage is applied to the electrodes.

15. The liquid crystal display apparatus of claim 12, wherein the ratio of the elastic coefficient of bend phase ($K_{33}$) to the elastic coefficient of splay phase ($K_{11}$) of the liquid crystal molecules in the liquid crystal layer is in the range of about 0.96 to about 1.25 at a temperature in a range of about 15° C. to about 25° C.

16. The liquid crystal display apparatus of claim 12, wherein the ratio of the elastic coefficient of bend phase ($K_{33}$) to the elastic coefficient of splay phase ($K_{11}$) of the liquid crystal molecules in the liquid crystal layer is in a range of about 1.00 to about 1.19 at a temperature in a range of about 36° C. to about 45° C.

17. The liquid crystal display apparatus of claim 12, wherein a gap between the first substrate and the second substrate is in a range of about 2.0 micrometers to about 4.0 micrometers.

18. The liquid crystal display apparatus of claim 12, wherein the liquid crystal molecules have a negative dielectric anisotropy.

* * * * *